(12) United States Patent
Fabian

(10) Patent No.: US 12,292,101 B2
(45) Date of Patent: May 6, 2025

(54) TRANSMISSION DEVICE FOR A MOTOR VEHICLE, DRIVE AXLE, AND MOTOR VEHICLE

(71) Applicant: Bayerische Motoren Werke Aktiengesellschaft, Munich (DE)

(72) Inventor: Karsten Fabian, Oberschleissheim (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 18/682,475

(22) PCT Filed: Aug. 24, 2022

(86) PCT No.: PCT/EP2022/073531
§ 371 (c)(1),
(2) Date: Feb. 9, 2024

(87) PCT Pub. No.: WO2023/046396
PCT Pub. Date: Mar. 30, 2023

(65) Prior Publication Data
US 2024/0344600 A1   Oct. 17, 2024

(30) Foreign Application Priority Data

Sep. 27, 2021   (DE) ..................... 10 2021 124 834.5

(51) Int. Cl.
*B60K 7/00*    (2006.01)
*B60K 1/02*    (2006.01)
(Continued)

(52) U.S. Cl.
CPC .......... *F16H 37/0806* (2013.01); *B60K 1/02* (2013.01); *B60K 17/08* (2013.01); *B60K 17/16* (2013.01);
(Continued)

(58) Field of Classification Search
CPC . F16H 37/0806; F16H 2048/343; B60K 1/02; B60K 17/08; B60K 17/16;
(Continued)

(56) References Cited

U.S. PATENT DOCUMENTS

| 8,936,130 B2 * | 1/2015 | Hirashita ............ B66F 9/07586 |
| | | 180/300 |
| 10,968,982 B2 * | 4/2021 | Barendrecht ........ B60K 17/043 |

(Continued)

FOREIGN PATENT DOCUMENTS

| CN | 111186294 A * | 5/2020 | ............... B60K 1/00 |
| DE | 10 2004 058 984 A1 | 6/2006 | |

(Continued)

OTHER PUBLICATIONS

International Search Report (PCT/ISA/210) issued in PCT Application No. PCT/EP2022/073531 dated Nov. 15, 2022 with English translation (5 pages).

(Continued)

*Primary Examiner* — Justin Holmes
(74) *Attorney, Agent, or Firm* — Crowell & Moring LLP

(57) ABSTRACT

A transmission device includes: a transmission drive spur gear which is rotationally fixed to an output element of a drive machine; a central spur gear which has an outer sprocket that meshes with the transmission drive spur gear, whereby a first transmission stage of the transmission device is formed, said central spur gear having an inner outer sprocket; and, a planetary transmission gear set which forms a second transmission stage of the transmission device and the sun gear sprocket of which is formed by the inner outer sprocket of the central spur gear, wherein a planetary gear set meshes with the sun gear sprocket and a ring gear sprocket of the planetary transmission gear set, said ring gear sprocket being fixed to the housing of the transmission (Continued)

device, whereby a planetary gear set carrier of the planetary transmission gear set forms an output element of the transmission device.

9 Claims, 2 Drawing Sheets

(51) Int. Cl.
*B60K 17/08* (2006.01)
*B60K 17/16* (2006.01)
*F16H 37/08* (2006.01)

(52) U.S. Cl.
CPC .... *B60K 7/0007* (2013.01); *B60K 2007/0061* (2013.01)

(58) Field of Classification Search
CPC .......... B60K 7/0007; B60K 2007/0061; B60K 17/356; B60K 2023/043
See application file for complete search history.

(56) References Cited

U.S. PATENT DOCUMENTS

| | | | | |
|---|---|---|---|---|
| 12,123,492 | B2* | 10/2024 | Hanker | B60K 7/0007 |
| 2005/0124450 | A1* | 6/2005 | Gady | B60K 1/02 |
| | | | | 475/5 |
| 2006/0180366 | A1 | 8/2006 | Brill et al. | |
| 2006/0225930 | A1* | 10/2006 | Schulte | B60K 6/52 |
| | | | | 180/65.245 |
| 2009/0211824 | A1 | 8/2009 | Knoblauch et al. | |

FOREIGN PATENT DOCUMENTS

| | | | |
|---|---|---|---|
| DE | 10 2006 046 419 A1 | 5/2008 | |
| DE | 10 2012 112 973 A1 | 6/2014 | |
| EP | 1 690 725 A2 | 8/2006 | |
| EP | 3 533 645 A1 | 9/2019 | |
| EP | 3 643 548 B1 | 3/2021 | |
| JP | 2021-112094 A | 8/2021 | |
| WO | WO 2012/007030 A1 | 1/2012 | |
| WO | WO-2019058766 A1 * | 3/2019 | B60B 35/14 |

OTHER PUBLICATIONS

German-language Written Opinion (PCT/ISA/237) issued in PCT Application No. PCT/EP2022/073531 dated Nov. 15, 2022 with English translation (8 pages).

German-language Search Report issued in German Application No. 10 2021 124 834.5 dated May 4, 2022 with partial English translation (11 pages).

* cited by examiner

TRANSMISSION DEVICE FOR A MOTOR VEHICLE, DRIVE AXLE, AND MOTOR VEHICLE

BACKGROUND AND SUMMARY

The present disclosure relates to a transmission device for a motor vehicle. The motor vehicle is in particular an at least partially electrically drivable motor vehicle, for instance: 1) a hybrid electric motor vehicle, the drivetrain of which has an electromechanical energy converter and an internal combustion engine, or 2) a purely electrically drivable motor vehicle, the drive train of which does not have an internal combustion engine. The disclosure also relates to a drive axle for such a motor vehicle. The drive axle is for example an electrical, in particular purely electrical drive axle. This means that the drive axle has at least one electromechanical energy converter, and in particular, does not have an internal combustion engine, or is not mechanically operatively connected to a crankshaft of the internal combustion engine to drive the motor vehicle. Moreover, the disclosure relates to a motor vehicle which is equipped with a transmission device mentioned in the introduction, in particular a drive axle comprising the transmission device.

In the production of vehicles, in particular the series production of vehicles, there is generally a need to arrange a multiplicity of assemblies and components within an outer skin of the motor vehicle as efficiently as possible in terms of structural space. In order to overcome this "packaging problem", attempts are presently being made to make the assemblies/components smaller and smaller. These efforts are, however, limited for strength reasons in the case of components/assemblies that are involved in the transmission of drive power in the motor vehicle. Expressed differently, what can happen is that an assembly/component which has been made too small is no longer able to transmit necessary forces, moments and/or speeds reliably, that is without a malfunction, such as breakage, etc. As a result, there is a conflict of aims between solving the packaging problem and the required stability of the components/assemblies for drive power transmission.

EP 3 643 548 B1 attempts to solve the packaging problem by arranging a gear arrangement in a hollow rotor of an electric motor, wherein the gear arrangement is for example a differential transmission. The result of this, however, is a particularly large inside diameter of the rotor shaft, which is in the form of a hollow shaft, of the electric motor, as a result of which the rotor must be particularly large, overall. This greatly limits a maximum speed of the rotor owing to particularly high centrifugal forces.

DE 10 2004 058 984 A1 also discloses a drive axle with an electric motor and a differential transmission arranged coaxially therewith, wherein an output shaft of the differential transmission extends through a rotor shaft, which is in the form of a hollow shaft, of the electric motor. In the case of this conventional drive axle, a multi-stage planetary transmission is arranged between the electric motor and the differential transmission, with the result that, during operation of this drive axle, the multi-stage planetary transmission is driven by the electric motor and the differential transmission is driven by the multi-stage planetary transmission. Accordingly, the output shaft of the differential transmission also extends through the multi-stage planetary transmission. The result of this is that this conventional drive axle has a particularly high number of components, and consequently, is particularly complex to produce and is particularly mass-intensive.

Coaxial concepts can only be realized with particularly high outlay, since an inside diameter of hollow shafts in question cannot be selected freely for strength reasons, and owing to centrifugal loading during operation. In the case of axially parallel concepts, for instance, with a spur-gear transmission or multiple spur-gear transmissions, the required transformation ratios result in structural space problems. It is also necessary to arrange multiple spur gears in the width direction, or axial direction, of the spur-gear transmission, this leading to an arrangement which is undesirably intensive in terms of structural space in the width direction. Providing drive of a planetary transmission without transformation, for example directly via an output shaft of a drive machine, for instance directly via a rotor shaft of an electromagnetic energy converter, leads to problems in terms of stability/strength of the planetary transmission, owing to high speeds of the output shaft. This relates in particular to planetary gears subjected to particularly high speeds during operation of the planetary transmission. The planetary gears would then have to be mounted with considerable outlay.

An object of the present disclosure is to provide a reliable and stable apparatus which is particularly efficient in terms of structural space in order to provide a desired transformation ratio between a drive machine and a transmission output element.

The transmission device according to the disclosure is intended for a motor vehicle, in particular, for an at least partially electrically drivable motor vehicle, for example, an electric motor vehicle. In the correct installation position of the transmission device, the motor vehicle comprises the transmission device. For example, the transmission device forms a constituent part of a drive axle of the motor vehicle, or for the motor vehicle.

The transmission device comprises a transmission drive spur gear which is connectable or connected to an output element, for example an output shaft, of a drive machine for conjoint rotation. In general, in this document, the expression "connected for conjoint rotation" is to be understood, among other things, as meaning that a relative rotation between the elements in question is prevented, for instance by toothed rings of the two elements in question meshing with/in one another. The drive machine is in particular an electromechanical energy converter ("electric motor"). The transmission device also comprises a central spur gear, which comprises an external outer or inner toothed ring. The corresponding toothed ring meshes with the transmission drive spur gear, as a result of which a first transmission stage of the transmission device is formed. The central spur gear also comprises an internal outer toothed ring which is different from the external outer or inner toothed ring.

The central spur gear has a central longitudinal middle axis, about which the toothed rings rotate or are rotated during operation of the transmission device. The external toothed ring is radially further to the outside than the internal toothed ring in relation to the longitudinal middle axis. Accordingly, the external toothed ring has a larger diameter than the inner toothed ring. The two toothed rings are fixed relative to one another, for example on a common central spur gear body, in that the central spur gear comprises the two toothed rings.

In general, in the present document, an outer toothed ring is to be understood to mean a toothed ring of which the teeth point radially outward from a corresponding longitudinal middle axis. A respective tooth base is in this case arranged closer to the longitudinal middle axis than a respective tooth tip. Accordingly, in the present document, an inner toothed ring is generally to be understood to mean a toothed ring of which the teeth point radially inward from a corresponding longitudinal middle axis. A respective tooth tip is in this case arranged closer to the longitudinal middle axis than a respective tooth base.

The transmission device has a further, or second, transmission stage which is formed by a planetary transmission gear set. The sun gear toothed ring of the planetary transmission gear set is formed by the internal toothed gear of the central spur gear. The second transmission stage, or the planetary transmission gear set, furthermore comprises a planetary gear set which comprises at least one planet gear and meshes with the sun gear toothed ring—that is with the internal toothed ring of the central spur gear. Moreover, the planetary gear set meshes with a ring gear toothed ring of the planetary transmission gear set, wherein the ring gear toothed ring is fixed on a housing of the transmission device. For example, the ring gear toothed ring and the housing of the transmission device are connected to one another, for example, formed in one piece with one another, by a force fit, form fit, and/or integral bond. In this respect, the ring gear toothed ring and the housing of the transmission device are arranged for conjoint rotation with one another.

By virtue of this arrangement of the elements of the planetary transmission gear set, in particular the teeth engagements described, a planetary gear set carrier, or planet carrier of the planetary transmission gear set, forms an output element of the transmission device. This advantageously gives the option of providing a desired transformation ratio between the output element of the drive machine and the output element of the transmission device. A two-stage spur gear transmission, which requires a particularly large structural space compared to the transmission device proposed here, is expediently dispensed with. Consequently, the transmission device enables particularly expedient packaging. Furthermore, the transmission device makes it possible to dispense with transmissions close to the wheel, for example, wheel hub transmissions, in that it is possible to arrange the transmission stages of the transmission device particularly close to the drive machine or the drive machines, since the transmission device is particularly narrow and thus efficient in terms of structural space in the axial direction. Furthermore, a special, particularly stable mounting of the planetary gear set can be dispensed with, since high speeds provided by the drive machine can be transformed via the first transmission stage, and therefore the planetary transmission gear set is advantageously subjected to only low speeds.

In a refinement of the transmission device, the external toothed ring of the central spur gear has an outer toothed ring which meshes with the transmission drive spur gear. As an alternative to this, the external toothed ring of the central spur gear can comprise an inner toothed ring, which meshes with the transmission drive spur gear. It can moreover be provided that the external toothed ring of the central spur gear comprises both the outer toothed ring and the inner toothed ring. In this case, the transmission drive spur gear then meshes either with the outer toothed ring or with the inner toothed ring, it then being the case that, for example, a power take-off element of the transmission device is formed by the corresponding other one of the toothed rings. Such a power take-off element may be used, for example, to drive an assembly, for instance a pump, a generator, etc. In this way, the transmission device is designed for particularly flexible, or versatile, use. In general, it holds true for the transmission device that the respective toothed ring can be straight-toothed and/or helically toothed.

The concept of an axially particularly narrow transmission device is accommodated to a particular extent in a further embodiment of the transmission device in which the toothed rings of the central spur gear are arranged coaxially. That is, the toothed rings of the central spur gear are arranged around a common portion of the longitudinal middle axis of the central spur gear. In general, in the case of the transmission device, it is provided that the longitudinal middle axis of the central spur gear and a longitudinal middle axis of the transmission device coincide. The longitudinal middle axis of the transmission device is also referred to as transmission main axis.

The central spur gear—and consequently the transmission device—is particularly reliable and stable in that, as provided in one refinement of the transmission device, the toothed rings of the central spur gear are formed in one piece with one another or are otherwise connected to one another by a force fit, form fit, and/or integral bond. For example, the toothed rings of the central spur gear may be provided together by primary forming. It is also conceivable for at least one toothed ring to be produced separately from the central spur gear body and then connected to the central spur gear body. To produce the central spur gear, that is to produce the toothed rings of the central spur gear, use can be made of machining and/or non-cutting manufacturing processes, chemical, thermal, and/or mechanical surface treatments, etc. In particular, it is conceivable that a disk of material is processed without cutting and/or by machining, as a result of which the toothed rings of the central spur gear and the central spur gear body are formed together. The central spur gear may be made completely or partially of a metallic material, for instance, a steel or another alloy, a sintered material, etc.

The first transmission stage of the transmission device has a first transformation ratio $i_1$ between the transmission drive spur gear and the central spur gear. The second transmission stage of the transmission device has a second transformation ratio $i_2$ between the sun gear toothed ring and the planetary gear set carrier or planet carrier. A refinement of the transmission device provides that an overall transformation ratio i of between 8 and 10 is produced by the transformation ratios $i_1$ and $i_2$ between the transmission drive spur gear and the planetary gear set carrier. Expressed differently: $8 \leq i \leq 10$. For example, the first transformation ratio $i_1$ and the second transformation ratio $i_2$ may each be 3. The transformation ratios $i_1$, $i_2$ may also have different values. In this way, it is ensured that the planetary transmission gear set of the transmission device is not subjected to undesirably high speeds. The overall transformation ratio i of between 8 and 10 is also particularly suitable for transforming the speeds provided by the drive machine into wheel rotational speeds (wheel:rim-tire combination) that are suitable for normal driving speeds of passenger cars.

The disclosure furthermore relates to a drive axle for a motor vehicle. Features, advantages, and advantageous embodiments of the transmission device according to the disclosure are to be considered features, advantages, and advantageous embodiments of the drive axle according to the disclosure, and vice versa.

The drive axle comprises a drive module which comprises a transmission device designed according to the above description and the drive machine, which is for example in the form of an electromechanical energy converter. The output element of the drive machine and the transmission drive spur gear of the transmission device are connected to one another for conjoint rotation. The transmission drive spur gear is formed, for example, in that the output element of the drive machine, for example, a rotor shaft of the electromechanical energy converter, and the toothed ring of the transmission drive spur gear are connected to one another for conjoint rotation. For example, a toothed ring of the transmission drive spur gear is connected to the output element, or the rotor shaft, by a force fit, form fit, and/or integral bond—that is to say for conjoint rotation. In this respect, the transmission drive spur gear may be at least partially formed by the output element of the drive machine, for example, by the rotor shaft.

If only a single drive module is used in the drive axle, one refinement of the drive axle may provide that the drive axle comprises a differential transmission, the differential drive element of which and the output element of the transmission device, that is to say, the planetary gear set carrier, are connected to one another for conjoint rotation. In this way, it is possible to use the drive axle to efficiently drive two wheels, or rim-tire combinations, that are spaced from one another by a track width, wherein a rotational speed equalization, for example, when cornering, between the wheels mounted on the drive axle is ensured. According to this embodiment, the drive machine is furthermore arranged between the differential transmission and the transmission device. In other words, the differential transmission and the transmission device are spaced from one another along the longitudinal middle axis of the transmission device, or along the transmission main axis, by a spacing, wherein this spacing is at least partially taken up by the drive machine. As a result, the corresponding drive axle is particularly narrow along the transmission main axis.

In a refinement of the drive axle, it comprises a further (second) drive module, wherein the central spur gears of the transmission devices are arranged along a common (imaginary) axis of rotation. The common axes of rotation and a respective longitudinal middle axis of the output elements of the transmission devices also coincide. In this respect, the transmission main axes of the transmission devices coincide, at least when the respective transmission main axis is extended imaginarily toward the corresponding other transmission device. Moreover, in this embodiment the two drive machines are arranged together between the transmission devices. In other words, the two transmission devices are spaced from one another at least over a width of the drive machines. This embodiment of the drive axle may provide that the differential transmission is omitted.

As the two drive machines, or the two electromechanical energy converters, are arranged together between the transmission devices, an assembly arrangement which is particularly narrow in the width direction of the drive axle is produced, as a result of which the packaging problem in the structure of the vehicle is mitigated. In other words, the drive axle is designed and usable particularly efficiently in terms of structural space.

The concept of a drive axis with a particularly narrow structure is accommodated to a particular extent in another embodiment, wherein the (respective) transmission device and drive elements for the wheels, or for the rim-tire combinations, of the drive axle or of the motor vehicle—that is to say peripheral drive elements, for instance wheel hubs—are then remote from one another. In other words, the respective transmission device is not a transmission device that is close to the wheel or integrated in the corresponding wheel drive element. Rather, the transmission device is arranged close to the corresponding drive machine and far from the wheel. For example, the transmission device and the corresponding drive machine are much closer, in particular closer by orders of magnitude, to one another than are the transmission device and the correspondingly assigned wheel. A spacing between the respective transmission device and the corresponding drive machine is for example a few millimeters, whereas a spacing between the wheel, or wheel drive element, and the transmission device may be a few centimeters, or more than one meter.

The disclosure moreover relates to a motor vehicle which comprises a transmission device designed according to the above description, in particular, a drive axle designed according to the above description. Features, advantages, and advantageous embodiments of the drive axle according to the disclosure are to be considered features, advantages, and advantageous embodiments of the motor vehicle according to the disclosure, and vice versa.

Further features of the disclosure can emerge from the claims, the figures, and the description of the figures. The features and combinations of features mentioned above in the description and the features and combinations of features shown below in the description of the figures and/or in the figures alone can be used not only in the respectively specified combination, but also in other combinations, or individually, without departing from the scope of the disclosure.

DETAILED DESCRIPTION OF THE DRAWINGS

Elements which are the same and have the same function are provided with the same reference signs in the figures. Geometric sizes (diameters, thicknesses, lengths, etc.) of elements illustrated in the figures and relative sizes—and consequently transformation ratios—cannot be derived from the figures; the figures are not true to scale. A transmission device 1, a drive axle 2 comprising the transmission device, and a motor vehicle 3 comprising the drive axle 2 will be explained together in the description below.

Figure 1:
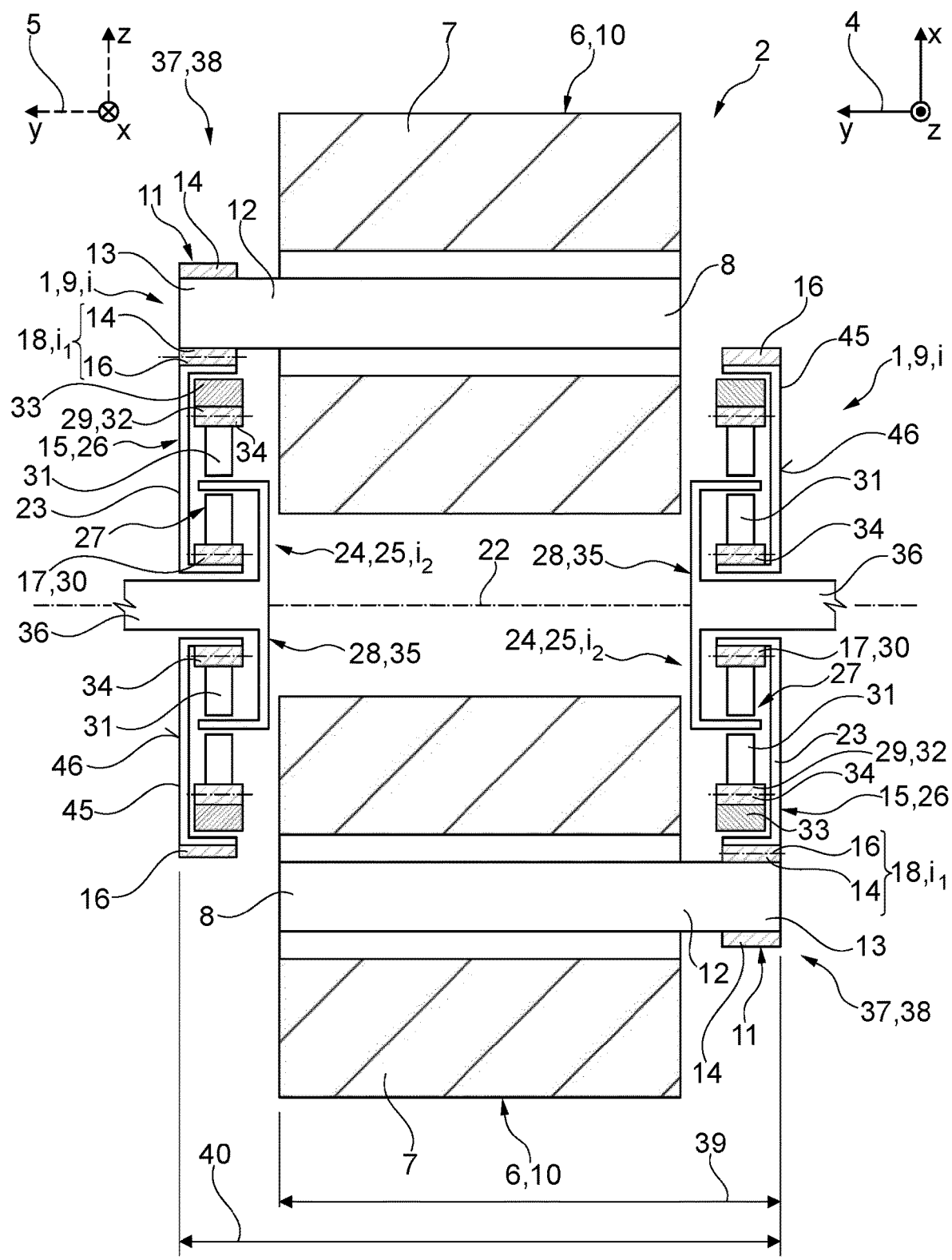
FIG. 1 shows a schematic and sectional view of a drive axle for a motor vehicle, with the drive axle comprising a transmission device.
Figure 2:
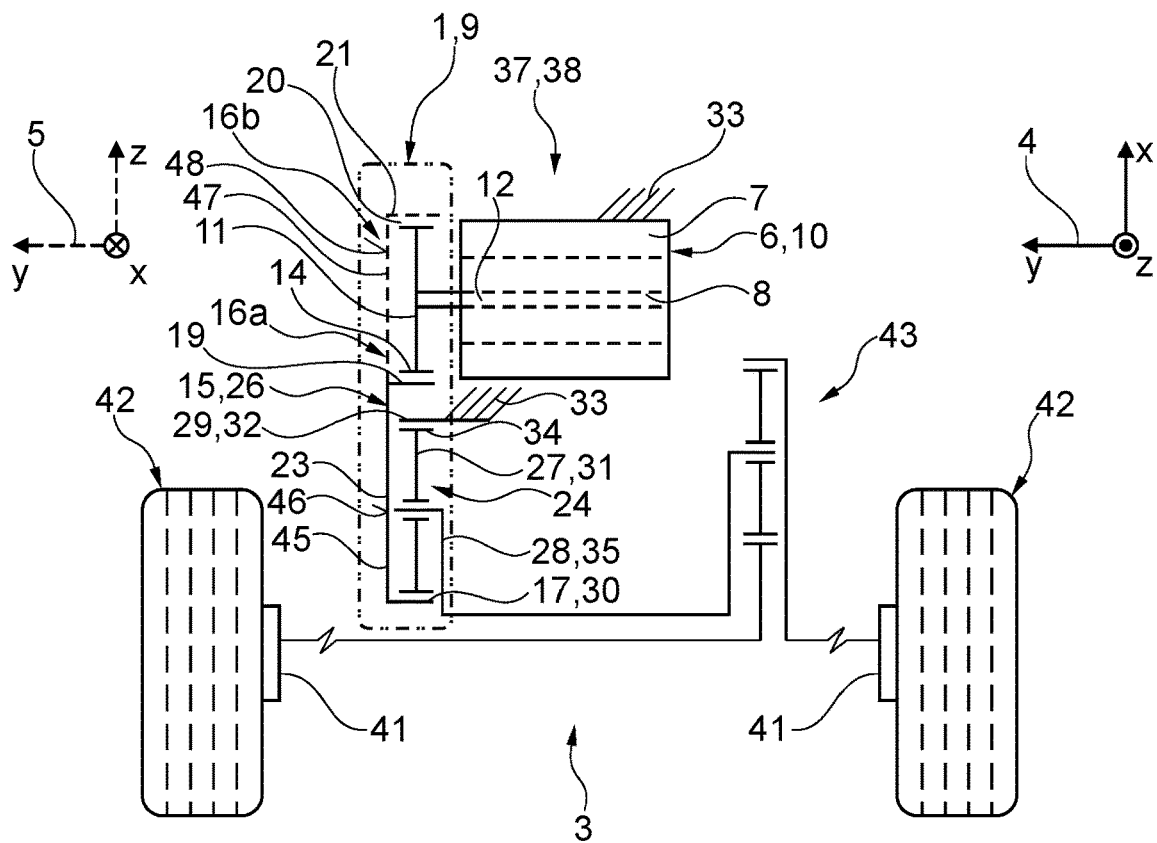
FIG. 2 shows a schematic view of the drive axle, which comprises a differential transmission; and, FIG. 3 shows a schematic view of a drive module of the drive axle.

FIG. 1 shows a schematic and sectional view of the drive axle 2, which is intended for the motor vehicle 3 (illustrated for the first time in FIG. 2). In the correct installation position of the transmission device 1—that is, when the drive axle 2 has been finished or already assembled for the intended use—the transmission device 1 forms a constituent part of the drive axle 2. In the correct installation position of the drive axle 2, it is fastened to a support structure (not illustrated) of the motor vehicle 3 and/or at least partially forms the support structure. The drive axle then forms a constituent part of the motor vehicle 3. As is known, the motor vehicle 3 has a direction of forward travel x, a transverse direction y and a vertical direction z. The sectional plane along which the drive axle 2 is illustrated in FIG. 1 is for example an X-Y plane of the motor vehicle 3. As an alternative, the sectional plane may be a Y-Z plane of the motor vehicle 3. It is also conceivable that the section of FIG. 1 is illustrated along a plane which coincides with the transverse direction y and is oblique in relation to the direction of forward movement x and to the vertical direction z. Examples of corresponding coordinate systems 4, 5 are illustrated in the figures.

The drive axle 2 has an electromechanical energy converter 6. The electromechanical energy converter 6 may be referred to as electric motor and has a stator 7 and a rotor shaft 8. The electromechanical energy converter 6 forms, for example, a traction machine of the drive axle 2, or of the motor vehicle 3. In the present example, the drive axle 2 has a further, or second, transmission device 9, in addition to the transmission device 1, and a further, or second, electromechanical energy converter 10, in addition to the electromechanical energy converter 6. In the present example, the electromechanical energy converters 6, 10 and the transmission devices 1, 9 have the same design, and therefore, only the transmission device 1 and the electromechanical energy converter 6 will be discussed below.

The transmission device 1 has a transmission drive spur gear 11, which in the present example is formed by the rotor shaft 8 of the electromechanical energy converter 6. For example, a shaft body 12 of the rotor shaft 8 and a transmission drive spur gear body 13 are formed in one piece with one another or otherwise connected to one another for conjoint rotation by a force fit, form fit, and/or integral bond. The transmission drive spur gear 11, in the present case the rotor shaft 8, has an outer toothing, that is to say an outer toothed ring 14.

The transmission device 1 also has a central spur gear 15, which has a first, external toothed ring 16, and a second, internal toothed ring 17. The outer toothed ring 14 of the transmission drive spur gear 11 and the external toothed ring 16 of the central spur gear 15 mesh with one another. This forms a first transmission stage 18 of the transmission device 1.

Looking at FIG. 2, it is clear that the external toothed ring 16 of the central spur gear 15 may have an outer toothed ring 19 formed separately from the outer toothed ring 14, it then being the case that the transmission drive spur gear 11 and the central spur gear 15 are coupled to one another for torque transmission, in that the outer toothed ring 19 and the outer toothed ring 14 of the transmission drive spur gear 11 mesh with one another. This embodiment of the external toothed ring 16, or the central spur gear 15, is characterized in FIG. 2 by the reference sign 16*a*.

In an alternative embodiment, the external toothed ring 16 has an inner toothed ring 20, wherein the central spur gear 15 and the transmission drive spur gear 11 are coupled to one another for torque transmission, in that the inner toothed ring 20 and the outer toothed ring 14 mesh with one another. This embodiment of the external toothed ring 16 is characterized in FIG. 2 by 16*b*. The external toothed ring 16*b*, which comprises the inner toothed ring 20, may have a further outer toothed ring 21, which is formed separately from the outer toothed rings 14, 19 and is or can be coupled to a further assembly of the drive axle 2 or of the motor vehicle 3 for torque and/or power transmission. Such an assembly may be, for example, an oil pump, or the like.

FIG. 1 also illustrates that the toothed rings 16, 17 of the central spur gear 15 are arranged coaxially. This means that the toothed rings 16, 17 are arranged around a common portion of a longitudinal middle axis 22 of the central spur gear 15 or of the transmission device 1. The toothed rings 16, 17 are accordingly arranged annularly around the longitudinal middle axis 22. In this way, the central spur gear 15—in spite of the toothed rings 16, 17—is particularly narrow in the axial direction, that is, along the longitudinal middle axis 22. In this way, the central spur gear 15 only has the width of a gearwheel, and is therefore advantageously particularly narrow.

The central spur gear 15 furthermore has a central spur gear body 23, on which the external toothed ring 16 and the internal toothed ring 17 are fixed. The toothed rings 16, 17 are fastened on the central spur gear body 23 for conjoint rotation with one another. The present example provides that the toothed rings 16, 17 are formed in one piece together with the central spur gear body 23.

The transmission device 1 also has a planetary transmission gear set 24, which forms a second transmission stage 25 of the transmission device 1. In general, such a planetary transmission gear set, that is also the planetary transmission gear set 24, comprises a sun gear 26, a planetary gear set 27, a planetary gear set carrier or planet carrier 28, and a ring gear 29.

In the present example, the sun gear 26 of the planetary gear set 24 is formed by the central spur gear 15. A sun gear toothed ring 30 of the sun gear 26 is formed by the internal toothed ring 17 of the central spur gear 15. The planetary gear set 27 has at least one planetary spur gear 31, or a multiplicity of planetary spur gears 31. In the present example, the ring gear 29 is in the form of a fixed gear of the planetary transmission gear set 24, in that a ring gear toothed ring 32 and a housing 33 of the transmission device 1 are connected to one another for conjoint rotation. The planetary gear set 27 forms a drive element for the planetary gear set carrier 28, in that the planetary gear toothed ring 34 of the respective planetary spur gear 31 meshes both with the ring gear toothed ring 32 and with the sun gear toothed ring 30. Owing to this arrangement, the planetary gear set carrier 28 of the planetary transmission gear set 24 forms an output element 35 of the transmission device 1. In the present case, the planetary gear set carrier 28 or the output element 35 of the transmission device 1 has a shaft portion 36. An alternative embodiment may provide that the shaft portion 36 and the planetary gear set carrier 28 are connected to one another for conjoint rotation.

A respective pairing of the transmission device 1 with the electromechanical energy converter 6 and the transmission device 9 with the electromechanical energy converter 10 forms a respective drive module 37, 38, which has a particularly small width or length 39 along the longitudinal middle axis 22 compared to conventional drive modules. A module arrangement as illustrated in FIG. 1 accordingly has a particularly small overall width 40. If a module arrangement as illustrated in FIG. 1 is used in the drive axle 2 or the motor vehicle 3 equipped with the drive axle 2, the respective shaft portion 36 extends between the output element 35 of the transmission device 1 and corresponding wheel drive elements, for example, wheel hubs 41 (illustrated for the first time in FIG. 2). The wheel drive elements or wheel hubs 41 are connected to a respective one of the shaft portions 36 for conjoint rotation and are designed to be connected to a tire-rim combination—that is a wheel 42 (illustrated for the first time in FIG. 2)—for conjoint rotation.

A respective one of the transmission devices 1, 9 is assigned to a respective one of the wheel drive elements, for example, a respective one of the wheel hubs 41. For example, one of the transmission devices 1, 9 is assigned to the left-hand wheel hub 41, whereas a second one of the transmission devices 1, 9 is assigned to the right-hand wheel hub 41. Expressed differently, one of the wheel hubs 41 can be driven by a respective one of the transmission devices 1, 9.

An overall transformation ratio i provided by the transmission device 1 is produced from a transformation ratio $i_1$ of the first transmission stage 18, and a second transformation ratio $i_2$ of the second transmission stage 25. In the present case, the transformation ratios $i_1$, $i_2$ are each 3, resulting in a value of 9 for the overall transformation ratio i. The transformation ratios $i_1$, $i_2$ may have values different than 3, with it being preferred for the overall transformation ratio i to be between 8 and 10 ($8 \leq i \leq 10$).

FIG. 2 shows a schematic view of the drive axle 2, which only has one of the drive modules 37, 38 by contrast to the previously described embodiment of the drive axle 2. In the present case, it is then provided that the drive axle 2 comprises a differential transmission 43, in order to enable equalization of the rotational speed between the wheels 42, for example, when cornering. In the present example, the differential transmission is in the form of a further planetary transmission gear set. However, other configurations of the differential transmission 43 are conceivable, for example, a bevel gear differential, etc. The corresponding differential transmission 43 may be lockable. A differential drive element 44 of the differential transmission 43 and the output element 35 of the transmission device 1, in particular, the planetary gear set carrier 28, are connected to one another for conjoint rotation. For example, the differential drive element 44 may be formed by the planetary gear set carrier 28.

It is also clear from FIG. 2 that, in this embodiment, the electromechanical energy converter 6, 10 is arranged between the differential transmission 43 and the transmission device 1, 9. As a result, an arrangement of the drive axle 2 on the transmission device 1, 9 of the electromechanical energy converter 6, 10 and of the differential transmission 43 is particularly narrow.

Figure 3:
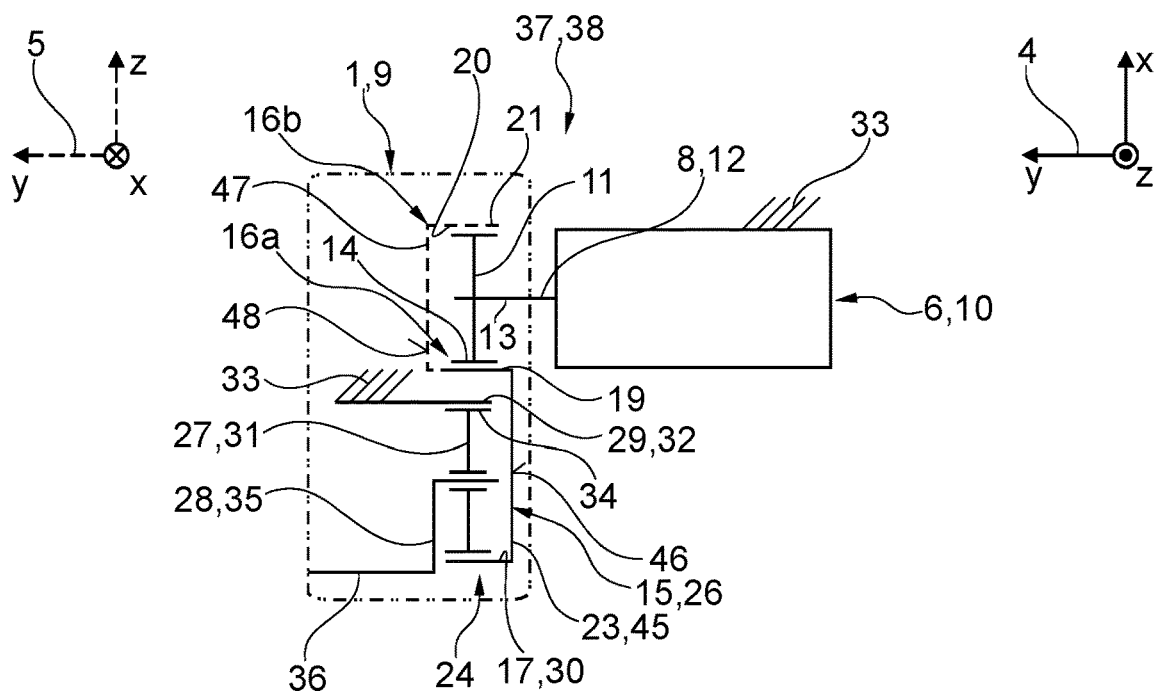

FIG. 3 shows a schematic view of one of the drive modules 37, 38 of the drive axle 2, wherein an alternative embodiment of the central spur gear 15 is illustrated. The closed face 46 of at least one circular ring disk part 45 of the central spur gear 15 faces toward the electromechanical energy converter 6, 10 as a departure from the previous description. As an alternative embodiment of the central spur gear 15 (see FIG. 1 and FIG. 2), this differs from the description set out above. In the embodiment of the central spur gear 15 according to FIG. 2 and FIG. 3, the central spur gear 15 has a further circular ring disk part 47, of which the closed face 48 faces away from the electromagnetic energy converter 6, 10.

Referring again to FIG. 1, it can be seen that, in the present example, the drive axle 2 comprises the two drive modules 37, 38, wherein the central spur gears 15 are arranged along a common (imaginary) axis of rotation. The axes of rotation and the respective longitudinal middle axis 22—and in particular the transmission main axis—coincide. It can furthermore be seen from FIG. 1 that the two drive machines or the two electromechanical energy converters 6, 10 are arranged together between the transmission devices 1, 9.

Considered together with FIG. 2, it is particularly clear that the corresponding transmission device 1, 9 is a respective transmission device remote from the wheel. In that case, the respective transmission device 1, 9 and the wheel drive elements or wheel hubs 41 are particularly remote from one another along the longitudinal middle axes 22, or along the transmission main axis. In other words, the transmission device 1, 9 performs the function of a transmission close to the wheel, or wheel hub transmission, but in the housing 33, instead of remote from the respective electromechanical energy converter 6, 10. This gives the transmission device 1, 9 a particularly compact form, in particular, along the transmission main axis.

Overall, the disclosure shows that the transmission device 1, the drive axle 2, and/or the motor vehicle 3 provide a (respective) reliable apparatus which is particularly efficient in terms of structural space and via which the desired transformation ratio i between the respective electromechanical energy converter 6, 10 and the output element 35 is provided. The transmission device 1 is designed particularly advantageously both in terms of an axial structural space requirement and in terms of a radial structural space requirement, as a result of which the packaging problem is particularly efficiently overcome.

LIST OF REFERENCE SIGNS

1 Transmission device
2 Drive axle
3 Motor vehicle
4 Coordinate system
5 Coordinate system
6 Electromechanical energy converter
7 Stator
8 Rotor shaft
9 Transmission device
10 Electromechanical energy converter
11 Transmission drive spur gear
12 Shaft body
13 Transmission drive spur gear body
14 Outer toothed ring
15 Central toothed ring
16 External toothed ring
16a External toothed ring
16b External toothed ring
17 Internal toothed ring
18 First transmission stage
19 Outer toothed ring
20 Inner toothed ring
21 Outer toothed ring
22 Longitudinal middle axis
23 Central spur gear body
24 Planetary transmission gear set
25 Second transmission stage
26 Sun gear
27 Planetary gear set
28 Planetary gear set carrier
29 Ring gear
30 Sun gear toothed ring
31 Planetary spur gear
32 Ring gear toothed ring
33 Housing
34 Planetary gear toothed ring
35 Output element
36 Shaft portion
37 Drive module
38 Drive module
39 Width
40 Overall width
41 Wheel hub
42 Wheel (tire-rim combination)
43 Differential transmission
44 Differential drive element
45 Circular ring disk part
46 Face
47 Circular ring disk part
48 Face
i Overall transformation ratio
$i_1$ Transformation ratio of the first transmission stage
$i_2$ Transformation ratio of the second transmission stage x Direction of forward travel
y Transverse direction
z Vertical direction

What is claimed is:

1. A motor vehicle drive axle comprising a first drive module and a second drive module, each drive module comprising a transmission device and a drive machine,
wherein each transmission device comprises:
a transmission drive spur gear, which is connected to an output element of the drive machine for conjoint rotation;
a central spur gear, which comprises an external toothed ring that meshes with the transmission drive spur gear, as a result of which a first transmission stage of the transmission device is formed, wherein the central spur gear has an internal outer toothed ring; and,
a planetary transmission gear set, which forms a second transmission stage of the transmission device and the sun gear toothed ring of which is formed by the internal outer toothed ring of the central spur gear, wherein a planetary gear set meshes with the sun gear toothed ring and with a ring gear toothed ring, fixed on a housing of the transmission device, of the planetary transmission gear set, as a result of which a planetary gear set carrier of the planetary transmission gear set forms an output element of the transmission device;
wherein the external toothed ring of the central spur gear, the internal outer toothed ring of the central spur gear, and the planetary gear set carrier are radially aligned; and,
wherein an output element of the first drive module and an output element of the second drive module are arranged along a common axis of rotation, the output element of the drive machine of the first drive module is arranged on a first side of the common axis of rotation, the output element of the drive machine of the second drive module is arranged on a second side of the common axis opposite the first side, and, at least a portion of the drive machine of the first drive module overlaps with a portion of the drive machine of the second drive module in the direction of motor vehicle travel.

2. The motor vehicle drive axle according to claim 1, wherein, for each transmission device:
the external toothed ring of the central spur gear comprises an outer toothed ring the teeth of which point radially outward, and/or an inner toothed ring, the teeth of which point radially inward.

3. The motor vehicle drive axle according to claim 1, wherein, for each transmission device:
the toothed rings of the central spur gear are arranged coaxially.

4. The motor vehicle drive axle according to claim 1, wherein, for each transmission device:
the toothed rings of the central spur gear are formed in one piece with one another.

5. The motor vehicle drive axle according to claim 1, wherein, for each transmission device:
the first transmission stage has a first transformation ratio between the transmission drive spur gear and the central spur gear, and the second transmission stage has a second transformation ratio between the sun gear toothed ring and the planetary gear set carrier, resulting in an overall transformation ratio of between 8 and 10 between the transmission drive spur gear and the planetary gear set carrier.

6. The motor vehicle drive axle according to claim 1, wherein, for each transmission device:
the central spur gears are arranged along the common axis of rotation;
the common axis of rotation and a respective longitudinal middle axis of the output elements of the transmission devices coincide; and,
the two drive machines are arranged together between the transmission devices.

7. The motor vehicle drive axle according to claim 1, wherein, for each drive module:
the transmission device and a respective wheel drive element are remote from one another, such that the transmission device is closer to the drive machine than the respective wheel drive element.

8. A motor vehicle comprising a motor vehicle drive axle according to claim 1.

9. The motor vehicle of claim 8, wherein each of the first drive module and the second drive module are positioned in a housing centrally located between respective wheel drive elements.

* * * * *